(12) United States Patent
McKim

(10) Patent No.: US 7,497,291 B1
(45) Date of Patent: Mar. 3, 2009

(54) MOTORCYCLE FOOT PEG

(76) Inventor: Nicholas S. McKim, 10310 N. 151st St., Waverly, NE (US) 68462

( * ) Notice: Subject to any disclaimer, the term of this patent is extended or adjusted under 35 U.S.C. 154(b) by 0 days.

(21) Appl. No.: 11/809,956

(22) Filed: Jun. 4, 2007

Related U.S. Application Data

(60) Provisional application No. 60/918,977, filed on Mar. 20, 2007.

(51) Int. Cl.
*B62J 25/00* (2006.01)
(52) U.S. Cl. .................. 180/90.6; 280/291; 280/164.1
(58) Field of Classification Search .............. 280/291, 280/163, 164.1, 288.4; 180/219, 90.6; 74/564; D12/110, 121
See application file for complete search history.

(56) References Cited

U.S. PATENT DOCUMENTS

| | | | | |
|---|---|---|---|---|
| 4,771,651 A | * | 9/1988 | Haro ........................... | 74/564 |
| 4,797,791 A | * | 1/1989 | Burchick ..................... | 362/473 |
| 6,129,370 A | * | 10/2000 | Hsieh et al. ................ | 280/291 |
| 6,142,499 A | * | 11/2000 | Hsieh et al. ................ | 280/291 |
| 6,648,357 B2 | * | 11/2003 | Hotch ........................ | 280/301 |
| 6,719,316 B1 | * | 4/2004 | Anthony ..................... | 280/291 |
| 6,789,927 B2 | * | 9/2004 | Tracey ....................... | 362/473 |
| 2005/0012300 A1 | * | 1/2005 | Egan .......................... | 280/291 |
| 2005/0206125 A1 | * | 9/2005 | Lindby ..................... | 280/304.3 |
| 2007/0120343 A1 | * | 5/2007 | Spence ....................... | 280/291 |

FOREIGN PATENT DOCUMENTS

JP 4-201685 * 4/1992

* cited by examiner

*Primary Examiner*—Anne Marie Boehler
(74) *Attorney, Agent, or Firm*—Dennis L. Thomte; Thomte Patent Law Office

(57) ABSTRACT

An illuminated foot or highway peg for a motorcycle is disclosed which is pivotally mounted to the underside of each of the floorboards of a motorcycle and which is selectively pivotally movable between a retracted position and an extended position. A ball detent mechanism yieldably maintains the foot peg in its retracted and extended positions and also enables the foot peg to break away to move towards its retracted position should it strike a foreign object while in its extended position.

1 Claim, 6 Drawing Sheets

MOTORCYCLE FOOT PEG

CROSS-REFERENCE TO RELATED APPLICATION

This application claims the benefit of U.S. Provisional Application Ser. No. 60/918,977 entitled "MOTORCYCLE FOOT PEG" filed Mar. 20, 2007, the disclosure of which is hereby incorporated herein by reference.

BACKGROUND OF THE INVENTION

1. Field of the Invention

This invention relates to a motorcycle foot peg or highway peg and more particularly to an illuminated foot peg or highway peg for a motorcycle which is pivotally movable between retracted and extended positions and which is yieldably maintained in each of those positions by a ball detent mechanism.

2. Description of the Related Art

Motorcycle foot pegs or highway pegs are designed to allow a motorcycle rider to position his or her foot off the side of the motorcycle, primarily during highway use. Conventional highway pegs have a major disadvantage. First, they cannot be concealed under the floorboard so that they are out of the way, but must be mounted on external areas of the motorcycle such as the frame or engine guard. The surfaces then become marred or blemished by mounting brackets or other hardware that leave damaged areas when the peg is removed. Further it is noted that the prior art foot pegs are not as visible as is necessary during darkness or rainy days.

SUMMARY OF THE INVENTION

A highway or foot peg (foot peg) is described which is pivotally connected to the underside of the floorboard of a motorcycle at each side thereof. The foot peg of this invention includes a mounting bracket which is secured to the underside of the floorboard and to which the foot peg is pivotally connected. The foot peg is selectively pivotally movable between a retracted position beneath the floorboard to an extended position wherein the foot peg extends outwardly from the floorboard. A ball detent mechanism yieldably maintains the foot peg in its extended and retracted positions. The detent ball mechanism also acts as a breakaway safety device for the foot peg while it is in its extended position. If the foot peg comes into contact with a foreign object while extended, it will release and allow the foot peg to move back towards the retracted position without causing the loss of control to the rider. The design of the foot peg complements the existing geometry of the motorcycle floorboard so that it blends in with the floorboard while the foot peg is in the retracted position. The foot pegs are illuminated for added safety in low light conditions such as night riding or rainy weather.

It is therefore a principal object of the invention to provide an improved highway or foot peg for a motorcycle.

A further object of the invention is to provide a foot peg of the type described which is concealed beneath the floorboard when in its retracted position.

Still another object of the invention is to provide a foot peg or highway peg for a motorcycle which includes a ball detent mechanism which yieldably maintains the foot peg in either a retracted position or an extended position and which will release, when in its extended position, should it come into contact with a foreign object.

Still another object of the invention is to provide a device of the type described which does not detract from the aesthetic appearance of the motorcycle.

Yet another object of the invention is to provide an illuminated foot peg or highway peg of the type described which is easily attachable to existing floorboards of the motorcycle.

These and other objects will be apparent to those skilled in the art.

DETAILED DESCRIPTION OF THE INVENTION

Figure 1:
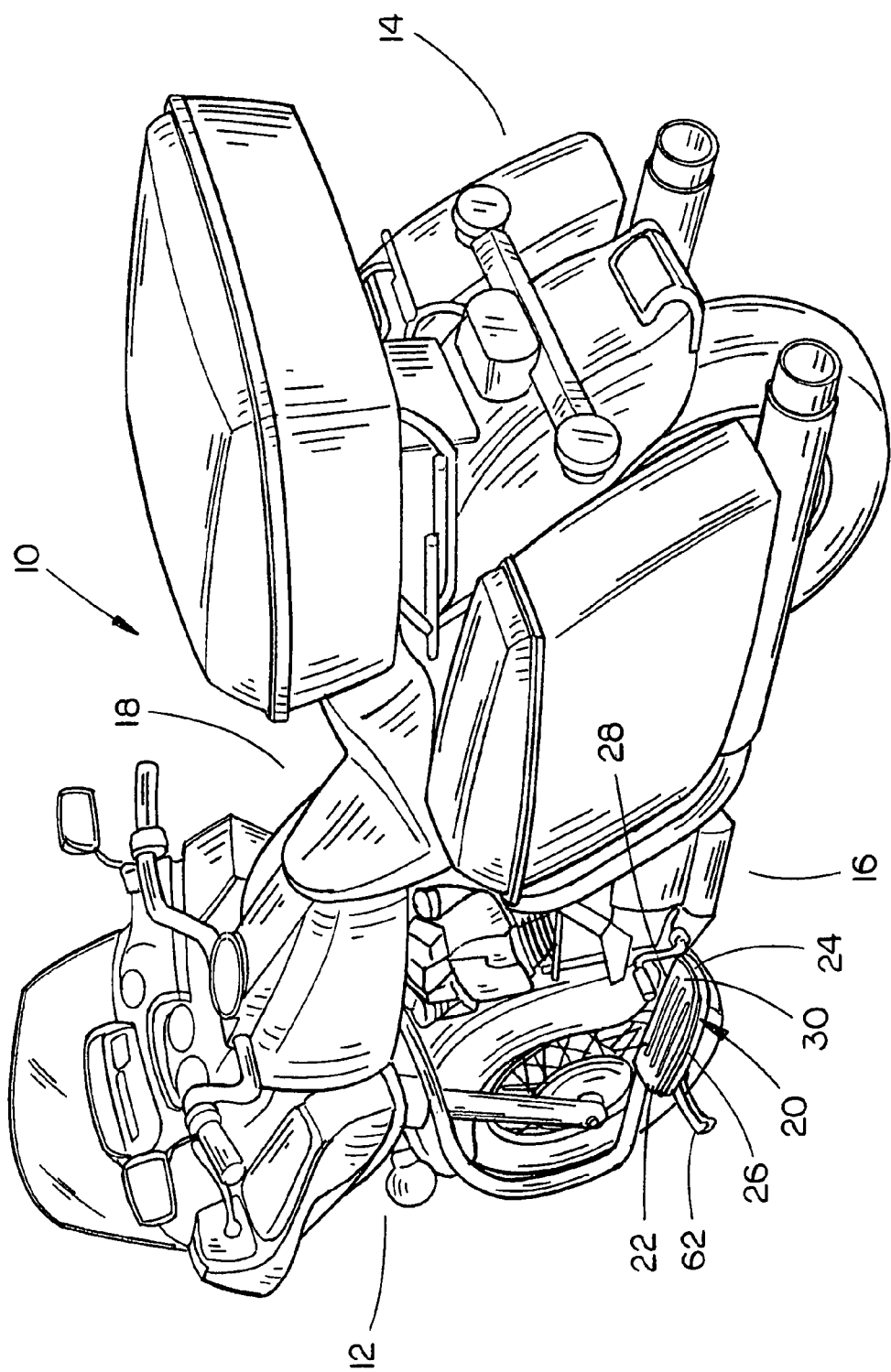
FIG. 1 is a rear perspective view of the left side of a motorcycle wherein a foot peg has been attached to the floorboard of the motorcycle and which is in its extended position.

The numeral 10 refers to a conventional motorcycle having a forward end 12, a rearward end 14, a left side 16, and a right side 18. Motorcycle 10 is provided with a floorboard 20 at its left side which is secured to the frame of the motorcycle in conventional fashion. For purposes of description, the floorboard 20 will be described as including a forward end 22, a rearward end 24, an outer side 26, an inner side 28, an upper surface 30, and a lower surface 32. The upper surface 30 may be selectively enclosed or covered by a decorative plate or covered in conventional fashion.

The conventional floorboard 20 is modified only by drilling a pair of openings 34 and 36 near the forward end 22 and outer side 26, respectively, to permit pan head screws 38 and 40 to be positioned therein. The right side of motorcycle 10 is also provided with a floorboard secured thereto which is a mirror image of floorboard 20 and which will not be shown or described for purposes of conciseness.

Figure 5:
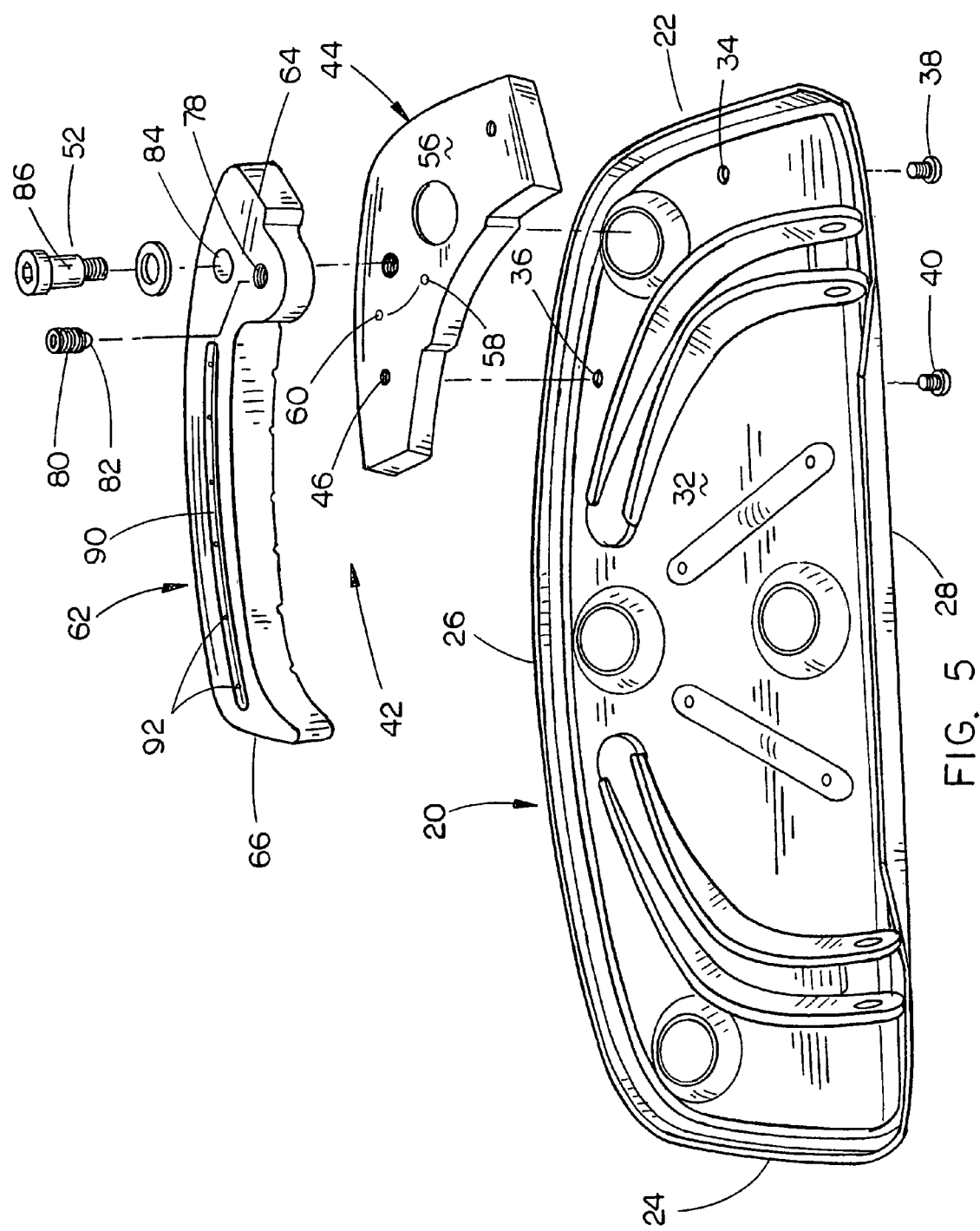
FIG. 5 is an exploded bottom perspective view of a floorboard and the foot peg of this invention.
Figure 6:
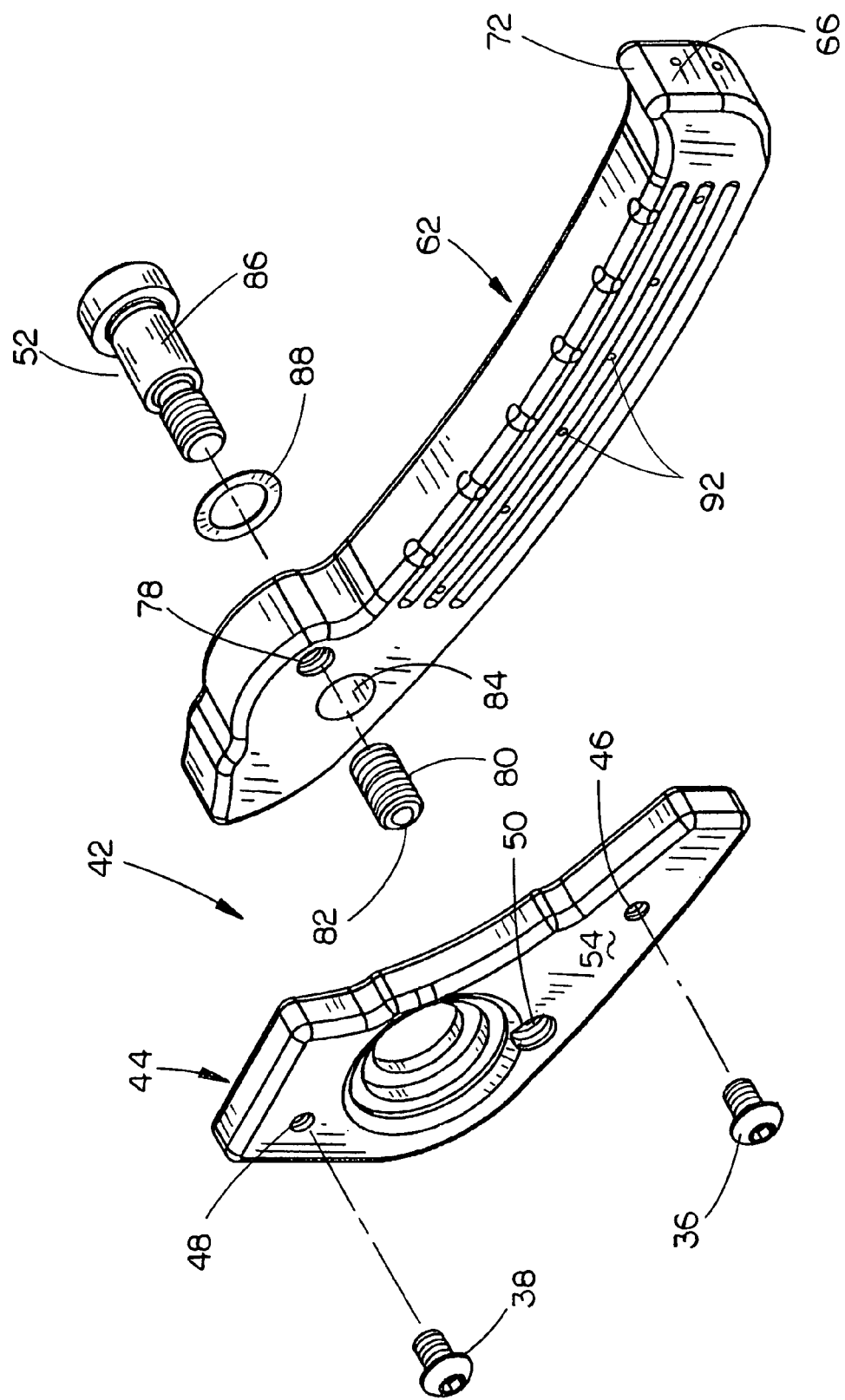
FIG. 6 is an exploded perspective view of the foot peg of this invention.

The foot peg assembly of this invention is referred to generally by the reference numeral 42 which is secured to the floorboard 20. A mirror image foot peg assembly is secured to the floorboard at the right side of the motorcycle. Foot peg assembly 42 includes a peg arm mounting bracket 44 which has internally threaded openings 46 and 48 formed therein adapted to threadably receive the screws 36 and 38 therein, respectively. Bracket 44 also has an internally threaded opening 50 formed therein adapted to receive a socket head shoulder bolt 42 as will be described hereinafter. For purposes of description, bracket 44 will be described as having an upper surface 54 and a lower surface 56. As seen in FIG. 5, the lower surface 56 of bracket 44 is provided with a pair of ball detents 58 and 60 formed therein.

Figure 2:
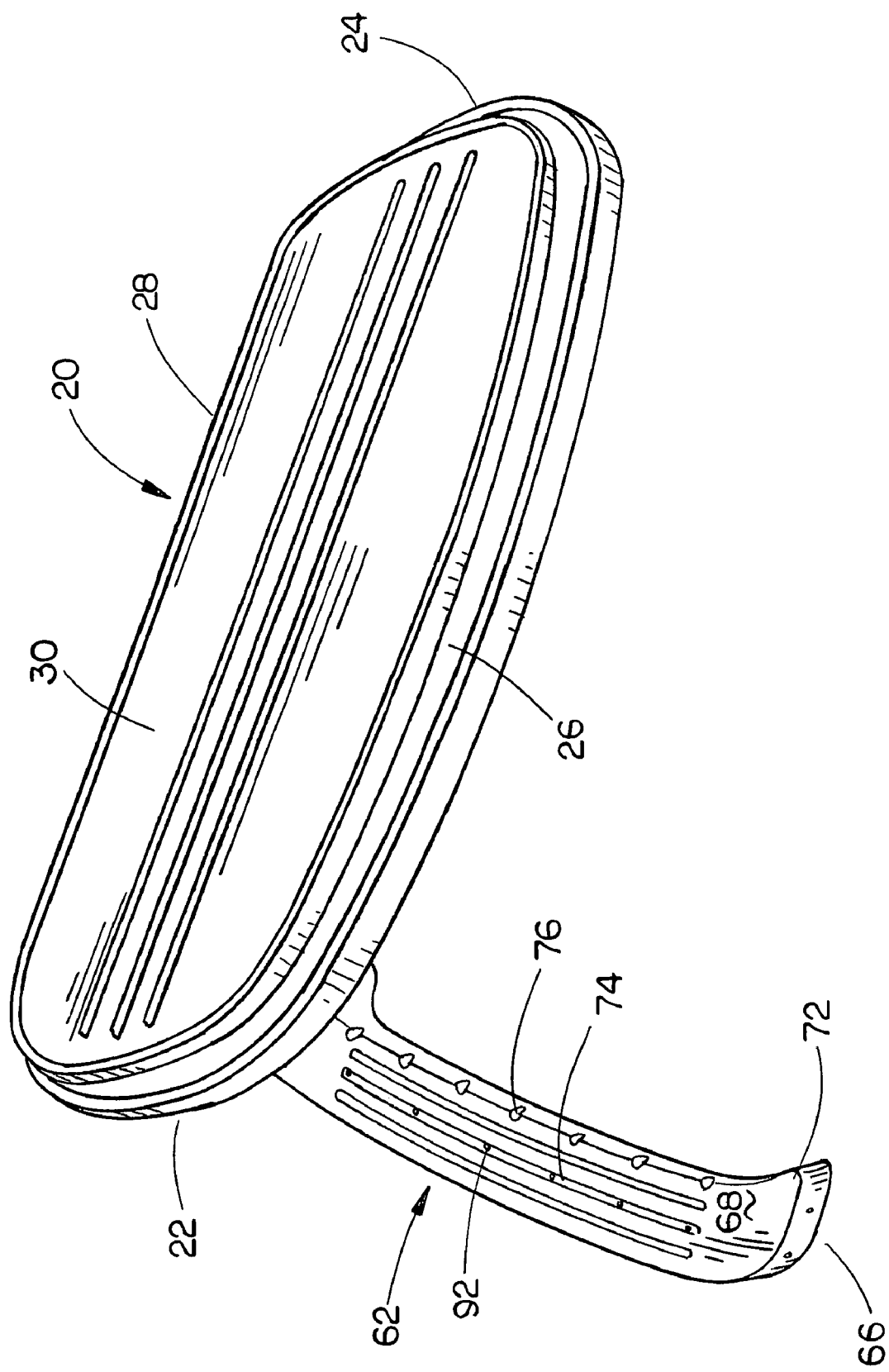
FIG. 2 is a perspective view of a motorcycle floorboard having the foot peg of this invention secured thereto with the foot peg being illustrated in its extended position.

Foot peg assembly 42 also includes a peg arm 62 which is selectively pivotally secured to the bracket 44 at the lower surface 56 thereof. Peg arm 62 includes an inner end 64, an outer end 66, an upper surface 68 and a lower surface 70. As seen in FIG. 2, the outer end 66 or peg 62 includes a rearwardly extending portion 72, when the peg arm is in the extended position of FIG. 2, to aid in preventing the rider's foot from slipping therefrom. The upper surface 68 of peg arm 62 is preferably provided with a plurality of spaced-apart grooves 74 formed therein as well as notches 76 formed therein. The outer side of peg arm 62, when the peg arm is in its retracted position, is designed to match the shape and style of the outer side 26 of floorboard 20. Peg arm 62 is provided with an internally threaded opening 78 formed therein which is adapted to threadably receive a ball plunger assembly 80 having a ball 82 protruding upwardly therefrom. Peg arm 62 also includes an opening 84 formed therein adapted to receive the non-threaded shank 86 of bolt 52 to enable peg arm 62 to pivot with respect to bracket 44.

The peg arm 62 is provided with an elongated slot or groove 90 formed in the underside thereof which communicates with a plurality of openings 92 formed therein. Openings 92 may have LED's therein or other illuminating means therein. Groove 90 is adapted to receive a fiber optic cable or electrical wire therein so that light is emitted from the openings 92 to enable the rider to better see the peg arm 62 in periods of low light, darkness or rainy conditions and so that the motorcycle is more illuminated so as to be more visible to other drivers.

The foot peg assembly 42 is attached and utilized as now will be described. The plate or cover which is attached to the top of the floorboard 20, if a plate or cover is a part of the floorboard, is removed. Openings 34 and 36 are then drilled in the floorboard 20. Bracket 44 is then placed adjacent the lower surface 32 of the floorboard 20 so that openings 46 and 48 in bracket 44 register with openings 36 and 34, respectively. Screws 38 and 40 are then extended downwardly through openings 34 and 36, respectively, and are threadably secured to internally threaded openings 48 and 46, respectively, to attach bracket 44 to the floorboard 20.

Figure 4:
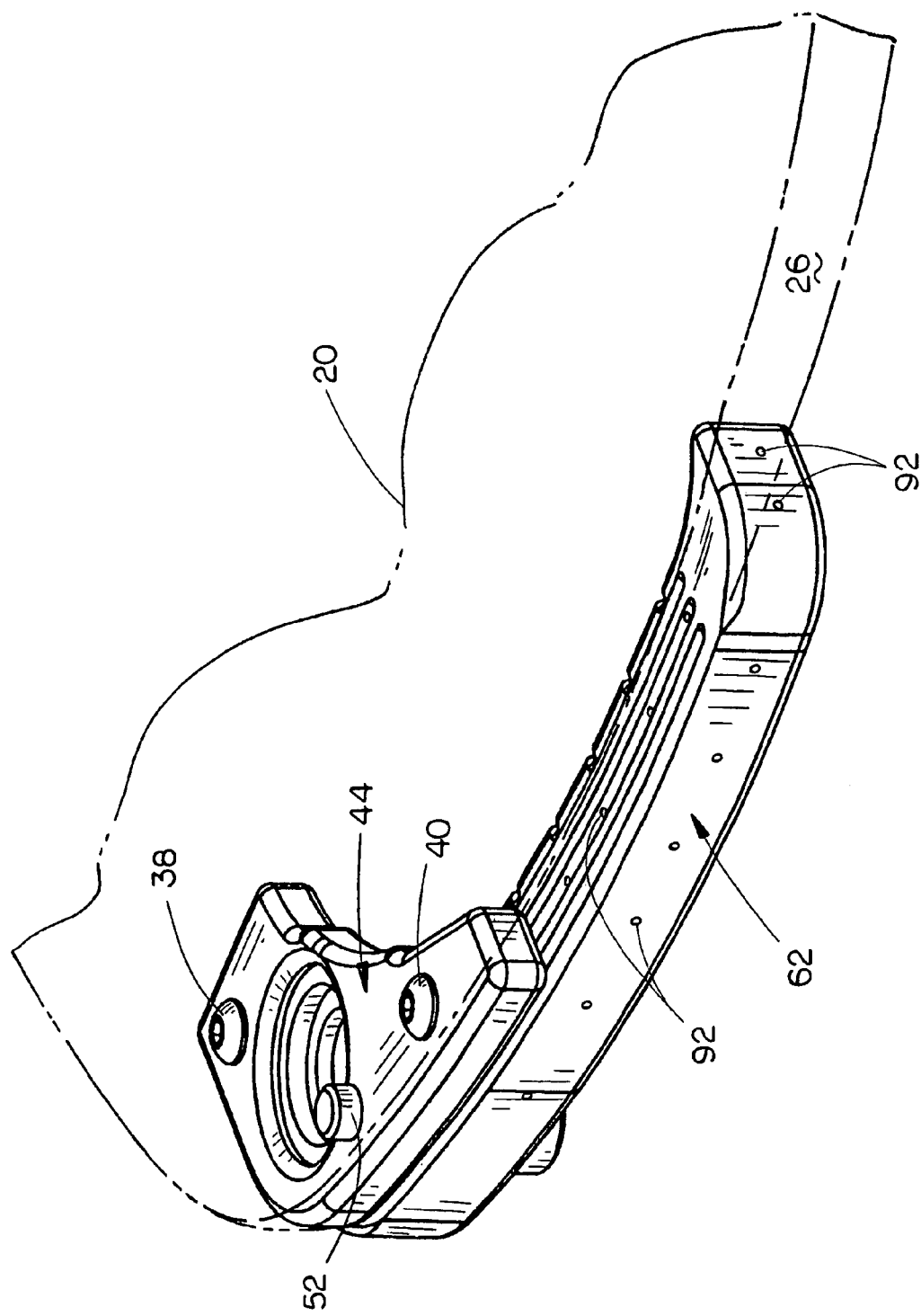
FIG. 4 is a view similar to FIG. 3 except that the foot peg is in its retracted position.

Ball plunger assembly 80 is then threadably inserted upwardly through opening 78 in peg arm 62 so that the ball 82 protrudes upwardly from the inner surface 68 of peg arm 62. Shim washer 88 is then positioned on bolt 52 and bolt 52 is then inserted upwardly through opening 84 of peg arm 62 with the threaded portion of bolt 52 being threadably received by opening 50 in bracket 44 to pivotally attach peg arm 62 to bracket 44. When the peg arm 62 is in its retracted position of FIG. 4, the ball 82 of ball plunger assembly 80 is received by ball detent 58 to yieldably maintain peg arm 62 in its retracted position. When in its retracted position, the outer surface of peg arm 62 will be flush with the outer side 26 of floorboard 20. At some point, the plate or cover is reinstalled on the top of the floorboard 20 if such a plate or cover is utilized.

Figure 3:
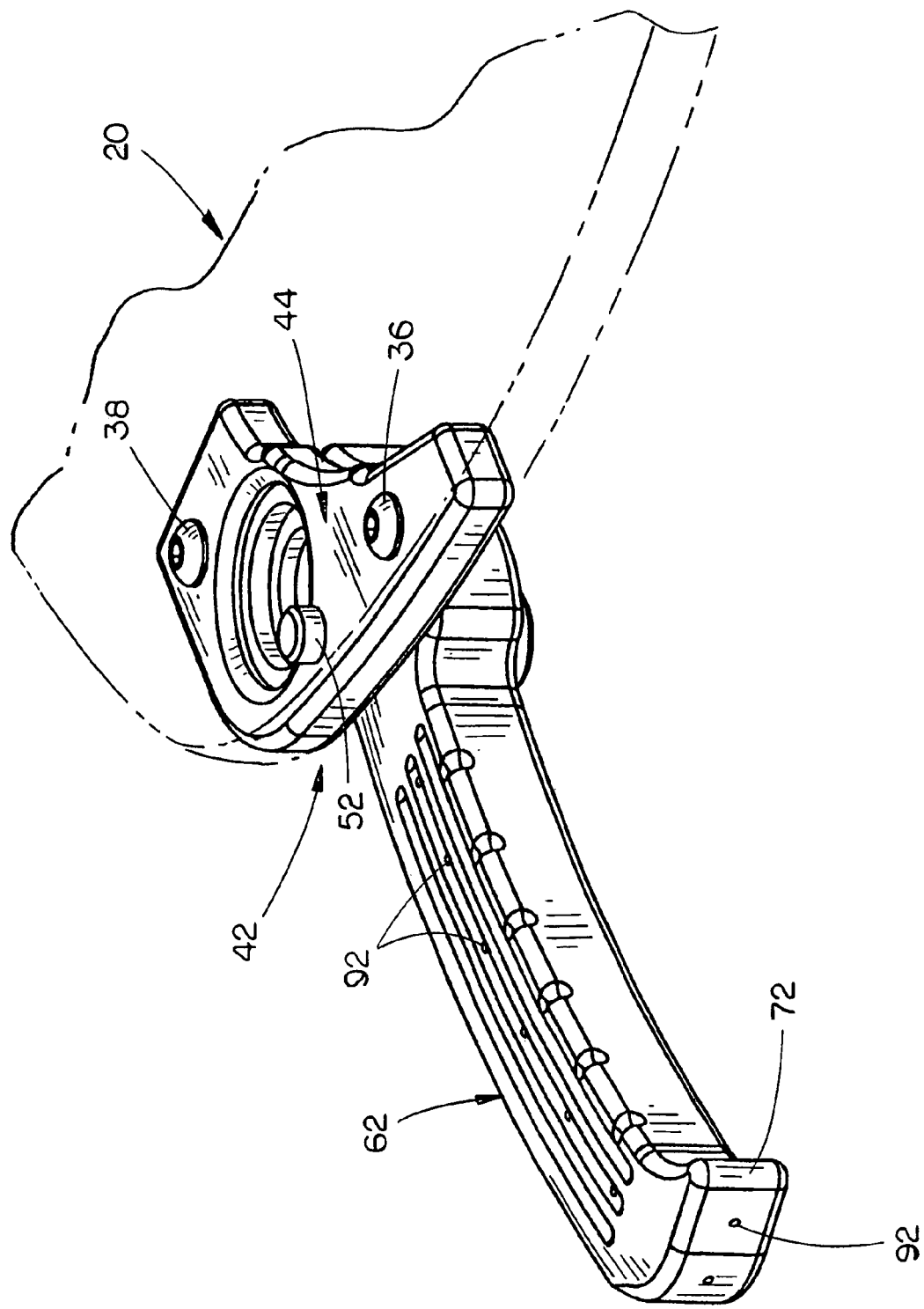
FIG. 3 is a perspective view of the foot peg assembly of this invention in its extended position beneath a floorboard of a motorcycle which is shown in broken lines.

When it is desired to extend the peg arm 62, the rider grasps the peg arm 62 and pivotally moves the peg arm 62 outwardly from floorboard 20 until the ball 82 of ball plunger assembly 80 is received by ball detent 60 to yieldably maintain the peg arm 62 in the extended position of FIGS. 1-3.

It can therefore be seen that an improved illuminated foot peg or highway peg has been provided which is concealed beneath the floorboard of the motorcycle when in its retracted position so as not to detract from the aesthetic appearance of the motorcycle. It can also be seen that the ball detent mechanism of this invention not only maintains the foot peg in its retracted and extended positions, but also enables the foot peg to pivotally break away towards its retracted position, when in its extended position, should it strike a foreign object without interfering with the operation of the motorcycle.

The peg arms 62 are illuminated as described hereinabove for added safety in low light conditions like night riding or rainy weather by way of the openings 92. This not only helps the rider being able to see the peg arms and where his/her feet are, but it also makes the motorcycle more visible to oncoming traffic. The peg arms 62 may be illuminated by fiber optic cables and/or LEDs. The light source may be mounted in an unexposed location on the motorcycle to accommodate the illumination of the peg arms 62.

Although a particular style floorboard is shown in the drawings, the foot pegs of this invention may be easily adapted for use with other styles of floorboards and may come as a complete unit, that is, a floorboard with a foot peg.

Thus it can be seen that the invention accomplishes at least all of its stated objectives.

I claim:

1. In combination with a motorcycle having a floorboard at each side thereof with the floorboards each having a top surface, a bottom, a forward end, a rearward end, and inner and outer sides; comprising:

an elongated foot peg, having inner and outer ends, pivotably secured at its inner end to each of said floorboards adjacent to the forward end and the outer side thereof;

each of said foot pegs being selectively movable between retracted and extended positions;

each of said foot pegs when in its said extended position, extending outwardly from the associated floorboard;

each of said foot pegs, when in its said retracted position, being positioned beneath the associated floorboard at the outer side thereof;

each of said foot pegs being yieldably held in its extended and retracted positions by a ball detent mechanism;

and a mounting plate, having upper and lower surfaces, secured to the bottom of each of the floorboards;

said foot pegs being selectively pivotally secured to each of said mounting plates;

said lower surface of each of said mounting plates having a pair of spaced-apart detent openings formed therein;

each of said foot pegs having a detent ball movably mounted therein which is selectively received by said detent openings to yieldably maintain said foot pegs in their said extended or retracted positions.

\* \* \* \* \*